Oct. 23, 1951   H. L. MUELLER   2,572,182

COASTER BRAKE

Filed June 20, 1946

*INVENTOR.*
HOMER L. MUELLER
BY
Oberlin & Limbach
ATTORNEYS

Patented Oct. 23, 1951

2,572,182

UNITED STATES PATENT OFFICE 2,572,182

COASTER BRAKE

Homer L. Mueller, Cleveland, Ohio, assignor to The Cleveland Welding Company, Cleveland, Ohio, a corporation of Ohio Application June 20, 1946, Serial No. 678,043

2 Claims. (Cl. 188—26)

The present invention relates as indicated to improvements in a coaster brake especially adapted for use on a bicycle or like vehicle.

One principal object of this invention is to provide a coaster brake which is extremely simple in structure but yet is capable of efficiently performing all of the usual functions of such brakes, viz., propelling and stopping the vehicle and permitting coasting thereof at the will of the operator.

It is another object of this invention to provide a coaster brake having associated therewith a novel form of brake shoe mounting and actuating mechanism.

Additional objects and advantages of the invention will become apparent as the following description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
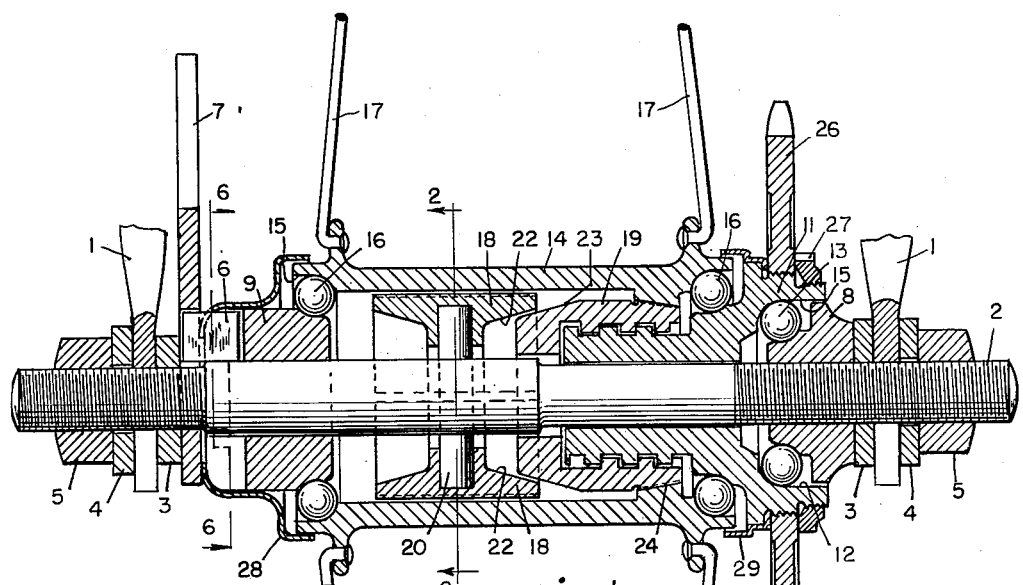
Fig. 1 is a central horizontal cross section view of my device showing the same in condition for propelling a bicycle.
Figure 2:
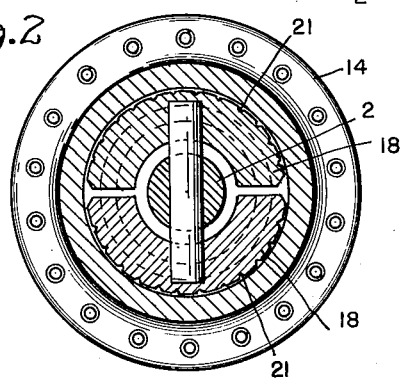
Fig. 2 is a transverse cross section view through the brake shoes taken along line 2—2 of Fig. 1.
Figure 3:
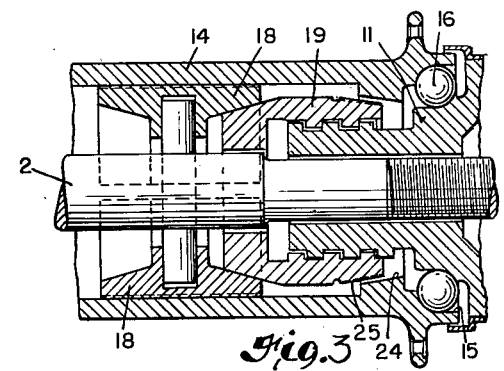
Fig. 3 is a fragmentary cross section view similar to that of Fig. 1 except showing the same in a brake shoe applying position.
Figures 4, 5:
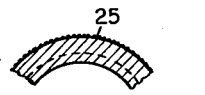
Figure 6:
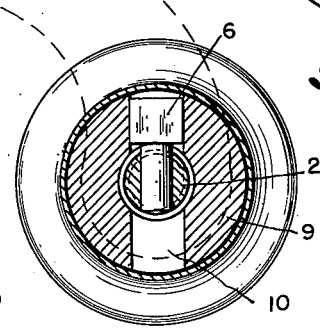

Figs. 4 and 5 are fragmentary detail views of one end of the driving nut, Fig. 5 being a cross section view taken along line 5—5 of Fig. 4; and Fig. 6 is a transverse cross section view through the mechanism for firmly non-rotatably locking the axle to the frame of the bicycle, such view having been taken along line 6—6 of Fig. 1.

Referring now to the drawing, there is shown therein a portion of each of the spaced apart frame members 1 which constitute the rear fork of a bicycle across the ends of which an axle 2 extends. Axle 2 is firmly secured against movement longitudinally of its axis by means of nuts 3 and 5 disposed on opposite sides of each frame member 1 and in threaded engagement with the threaded ends of the axle. Suitable washers 4 are disposed between nuts 5 and one side of the members 1. In order to non-rotatably secure axle 2 to the bicycle frame, one end thereof is formed with a transverse hole in which is fitted a key 6, the radially projecting portion of which is fitted into an opening of complementary cross section in one end of an arm 7. The other end of arm 7 is in turn firmly connected to one of the members 1 in a manner so well known to those skilled in the art that further illustration and explanation thereof is deemed unnecessary.

Mounted on said axle 2 in spaced relation to one another are two rings 8 and 9, each of which constitutes one of the races for a combination thrust and radial ball bearing. Ring 8 is in threaded engagement with axle 2 and is locked longitudinally thereof by nut 3, while ring 9 is slidable on the axle but non-rotatable thereon by reason of the slotted end 10 thereof fitting over the radial projecting portion of the key 6.

Rotatably mounted on axle 2 is a driving screw 11 which has a counterbored end 12 forming the outer race for the balls 13 disposed between counterbore 12 and ring 8. Also mounted for rotation about axle 2 is a hub sleeve 14, the opposite counterbored ends 15 of which form the races for the balls 16 disposed between one counterbore 15 and ring 9 and between the other counterbore 15 and driving screw 11. Hub sleeve 14 is, of course, provided with suitable apertured flanges for spokes 17, which spokes are connected to the rim of the rear wheel of the bicycle, not shown.

It is now apparent that the hub sleeve 14 and the driving screw 11 are independently rotatable relative to axle 2. It is also apparent that by properly adjusting the ring 8 longitudinally of the axle, the hub sleeve can only rotate about an axis coincidental with that of axle 2 and cannot partake of longitudinal or tilting movement relative to such axis.

Within hub sleeve 14 is a pair of brake shoes 18 and a driving nut 19, the former being slidably mounted on the ends of a pin 20 fitted into a transverse hole in the axle and the latter being in threaded engagement with the threaded end of the driving screw 11 which projects into the hub sleeve. Pin 20 is preferably disposed horizontally so that the shoes 18, slidably carried by the ends thereof, will not tend by gravity to engage the inner cylindrical wall of the hub sleeve. The outer semi-cylindrical surface of each brake shoe is preferably formed with longitudinal serrations 21 therein to increase the friction when the same is urged into engagement with the inner wall of the hub sleeve. The inner surface of each brake shoe 18 is formed with a tapered wall 22, both shoes together defining a frusto-conical wall adapted to be engaged with by the correspondingly tapered end 23 of the driving nut 19.

The hub sleeve 14 is also provided with a frusto-conical surface 24 at its one end spaced from and facing toward the surfaces 22 of the brake shoes 18. The driving nut 19 is formed at its other end with a tapered surface 25 engageable with the surface 24 in the hub sleeve. End 25 of the driving nut is preferably serrated as clearly shown in Figs. 4 and 5 to assure a firmer lock between the driving nut 19 and the hub sleeve 14 than would be possible between two perfectly smooth frusto-conical surfaces. The longitudinal spacing between surfaces 22 and 24 is greater than between the tapers 23 and 25 so that the driving nut 19 will be in engagement with either or none of them depending on whether it is desired to brake or to propel the vehicle or to permit coasting thereof respectively. The movement of driving nut 19 longitudinally in opposite directions will be presently described with greater particularity.

Secured to driving screw 11 is a sprocket wheel 26 which constitutes one element of the usual chain drive mechanism employed in most all bicycles. Sprocket wheel 26 is preferably in threaded engagement with driving screw 11 and is locked in place by means of a lock nut 27. Adjacent each end of hub sleeve 14 and secured respectively to ring 9 and to driving screw 11 are dust caps 28 and 29 to exclude dirt from the ball bearings 16.

It can now be seen that when the sprocket wheel 26 is rotated clockwise, as viewed from the right-hand end of Fig. 1, that rotation of driving screw 11 relative to driving nut 19 effects movement of the latter toward the right to the position shown in Fig. 1, whereby continued rotation of the drive screw 11 effects, through the nut 19 and its engagement with tapered surface 24 of the hub sleeve 14, a driving of the hub sleeve in a clockwise direction to thus propel the bicycle in a forward direction.

Now, if the driving screw is rotated counter-clockwise, as viewed from the right-hand end of Fig. 1, it can be seen that such rotation relative to driving nut 19 will effect movement of the latter toward the left into engagement with the tapered surfaces 22 of the brake shoes 18 to force the same apart in a radial direction into frictional engagement with the inner cylindrical wall of hub sleeve 14. In this way rotation of hub sleeve 14 relative to axle 2 is stopped or retarded as desired.

Of course, if the drive screw is rotated slightly clockwise from the brake shoe applying position described above, the driving nut 19 will move to a position between the tapered surfaces 22 and 24 whereby the hub sleeve 14 can freely rotate relative to axle 2 about the bearings 16. During propelling of the bicycle it is not necessary to actually rotate the driving screw 11 counter-clockwise to effect movement of the driving nut 19 to a coasting position but merely to discontinue clockwise rotation thereof, whereby the continued clockwise rotation of the hub sleeve 14 will, through the engagement of surfaces 24 and 25, effect rotation of the driving nut 19 relative to driving screw 11 to thereby disengage such surfaces.

It is to be observed that the relative rotation of the driving nut 19 and the driving screw 11 to enable propelling, braking, and coasting of the bicycle is effected solely by an inertia action whereby the nut 19 lags behind driving screw 11 when the latter is rotated in either direction. Thus, all of the desired functions of the device are obtained without the use of springs or other resilient means.

As indicated above, the pin 20 is preferably disposed in a horizontal position so that when the driving nut is disengaged from the brake shoes 18, there will not be any drag of the brake shoes against the hub sleeve 14, as would be the case if pin 20 were disposed in a vertical position.

As a matter of design, the bearing rings 8 and 9, the drive screw 11 and the driving nut 19 are preferably made of case hardened steel to resist wear. The hub sleeve 14 is preferably made of steel and the brake shoes 18 are preferably made of brass, such materials being selected for reasons of their desirable friction properties.

Key 6 and pin 20 are preferably press fitted into their respective bores in the axle.

It is to be noted that the wear and deformation of the inter-engaged surfaces of the opening in arm 7 and of the radially projecting rectangular portion of the key 6 is minimized inasmuch as the contact pressure between such surfaces for a given torque is reduced to a point considerably less than what it would be if the usual connection were employed in which the axle has milled flats thereon and the arm has an opening of complementary cross section. This improved connection thus precludes loosening of the axle and arm connection so that the pin 20 will always be disposed horizontally as is desirable. This same rectangular portion of the key 6 being engaged in a slot in the ring 9 also holds the latter against rotation relative to the axle. Thus, it can be seen that I have provided an extremely simple and effective means for locking the axle 2 and the ring 9 against any rotation whatsoever relative to one another and to the bicycle frame.

Other modes of applying the principle of the invention may be employed, change being made as regards the details described, provided the features stated in any of the following claims or the equivalent of such be employed.

I therefore particularly point out and distinctly claim as my invention:

1. A coaster brake comprising an axle including one pair of diametrically opposite and horizontally disposed radial projections, a hub shell and a driving screw each rotatably mounted on said axle, one pair of brake shoes slidably carried on such projections respectively for horizontal radial movement into and out of engagement with said shell, and a nut having threaded engagement with said screw and alternately movable in opposite directions axially of said axle in response to rotation of said screw in opposite directions, said shoes and nut including inter-engageable cam surfaces operative when said nut is moved axially in one direction to cause radial movement of said shoes into frictional engagement with said shell to thereby resist rotation of said shell on said axle.

2. In a coaster brake for bicycles, the combination of an axle formed with a transverse hole of circular cross-section adjacent one end thereof, a pin fitted into such hole having a radial projection of non-circular cross-section presenting opposed parallel faces extending axially of said axle, a radially extending arm on said axle adapted for connection with a bicycle frame, said arm being formed with an opening therethrough non-rotatably embracing a portion of the opposed faces of the projection of said pin whereby to fix said axle against rotation, a ring on said axle adjacent to said arm formed with a radial slot also embracing a portion of the opposed faces of the projection of said pin whereby to non-rotatably lock said ring on said axle, a hub shell surrounding said axle, bearing means between said ring and shell rotatably supporting said shell on said axle, a brake element nonrotatably, radially movably carried by said axle for movement into frictional engagement within said hub shell to arrest rotation of said hub shell while said arm, through said pin, holds said axle and brake element thereon against rotation and while said pin holds said ring against rotation on said axle, and means for moving said brake element as aforesaid.

HOMER L. MUELLER.

REFERENCES CITED

The following references are of record in the file of this patent:

UNITED STATES PATENTS

| Number | Name | Date |
|---|---|---|
| 625,285 | Willits | May 16, 1899 |
| 939,411 | Gottschalk | Nov. 9, 1909 |
| 1,000,354 | Walker | Aug. 8, 1911 |
| 1,023,347 | Whittington | Apr. 10, 1912 |
| 1,089,997 | Walker | Mar. 10, 1914 |
| 1,125,142 | Lutze | Jan. 19, 1915 |
| 1,157,064 | Tobin | Oct. 19, 1915 |
| 2,012,893 | Schmidt | Aug. 27, 1935 |
| 2,087,657 | Schmidt | July 20, 1937 |
| 2,189,956 | Kurzina, Jr. | Feb. 13, 1940 |
| 2,321,150 | Lewis | June 8, 1943 |
| 2,333,753 | Walther et al. | Nov. 9, 1943 |
| 2,388,403 | Garnett et al. | Nov. 6, 1945 |
| 2,410,785 | Hood | Nov. 5, 1946 |
| 2,475,492 | Goepfrich et al. | July 5, 1949 |

FOREIGN PATENTS

| Number | Country | Date |
|---|---|---|
| 213,062 | Great Britain | Aug. 14, 1924 |
| 300,925 | Germany | Sept. 29, 1917 |